United States Patent
Kononov et al.

(10) Patent No.: US 7,744,672 B2
(45) Date of Patent: Jun. 29, 2010

(54) PROCESS FOR PRODUCING A NITROGEN-POTASH FERTILIZER

(75) Inventors: Sergey Mikhailovich Kononov, Nevinnomyssk (RU); Anatoliy Nikolaevich Avramenko, Nevinnomysak (RU); Oleg Anatolievich Shirobokov, Nevinnomyssk (RU); Victor Nikolaevich Gromotkov, Nevinnomyssk (RU); Victor Filippovich Perepechko, Nevinnomyssk (RU); Victor Alekseevich Tzarevskiy, Nevinnomyssk (RU); Igor Andreevich Mitzak, Nevinnomyssk (RU); Vyacheslav Mikhailovich Ovchinnikov, Nevinnomyssk (RU); Stanislava Stanislavovna Kostuchenko, Nevinnomyssk (RU); Evdokiya Nikolaevna Kontareva, Nevinnomyssk (RU)

(73) Assignee: Open Joint Stock Company "Mineral and Chemical Company EuroChem" (RU)

(*) Notice: Subject to any disclaimer, the term of this patent is extended or adjusted under 35 U.S.C. 154(b) by 325 days.

(21) Appl. No.: 11/719,674

(22) PCT Filed: Nov. 17, 2005

(86) PCT No.: PCT/RU2005/000577

§ 371 (c)(1), (2), (4) Date: Sep. 28, 2007

(87) PCT Pub. No.: WO2006/057573

PCT Pub. Date: Jun. 1, 2006

(65) Prior Publication Data

US 2009/0173124 A1    Jul. 9, 2009

(30) Foreign Application Priority Data

Nov. 19, 2004 (RU) .............................. 2004133766

(51) Int. Cl.
*C05D 9/02* (2006.01)
*C07D 293/10* (2006.01)

(52) U.S. Cl. ..................................... 71/33; 71/35; 71/37

(58) Field of Classification Search ................ 71/33–37
See application file for complete search history.

(56) References Cited

U.S. PATENT DOCUMENTS

2006/0010949 A1 *   1/2006   Palmer et al. .............. 71/64.11

FOREIGN PATENT DOCUMENTS

| EP | 0 104 705 | 4/1984 |
|----|-----------|--------|
| RU | 1 288 179 | 2/1987 |
| RU | 1 502 550 | 8/1989 |
| RU | 2 233 823 | 8/2004 |

OTHER PUBLICATIONS

International Search Report; PCT/RU2005/000577; Mar. 23, 2006.
M.E. Pozin, Tekhnologiya mineralynykh udobreny, Leningrad, Khimiya, 1983, pp. 56-58.

* cited by examiner

*Primary Examiner*—Stuart Hendrickson
*Assistant Examiner*—Richard M Rump
(74) *Attorney, Agent, or Firm*—Fish & Richardson P.C.

(57) ABSTRACT

The invention relates to the chemical industry and can be used while producing granulated nitrogen-potash fertilizers. An ammonia nitrate melt in the amount of 33-69 weight %, potassium chloride in the amount of 22-65 weight %, and a specific mineral admixture—phosphogypsum in the amount of 2-9 weight % are fed into a mixture as well as ammonia, which is necessary for keeping pH value of the mixture within the range of 6.5-7.5. The obtained slurry is sprayed onto a recycle product in a drum granulator and granulated under a recycle ratio being equal to 1:(2-2.5), the final product is dried. A stirring is carried out under the optimal operational mode within the temperature range of 100-130° C. during 20-30 minutes. Due to such conditions, a productivity rate of the process is increased and granules of the fertilizer have higher strength and reduced leachability from the soil.

2 Claims, No Drawings

PROCESS FOR PRODUCING A NITROGEN-POTASH FERTILIZER

The invention relates to processes for producing nitrogen-potash fertilizers of ammonium nitrate and potassium chloride that are used in agriculture and could be used in a chemical industry in the manufacture of mineral fertilizers.

STATE OF THE ART

A process for producing nitrogen-potash fertilizer, which comprises a mixing of ammonium nitrate melt and potassium chloride with a mineral sulphur-containing addition, and a granulation of the mixture produced in a drum granulator-dryer, is known from Patent RU 2154620, IPC C05C1/02, 2000. The disadvantages of the known process are a low productivity rate (that is caused by a lack of recycle materials and, as a result—the longer granulation time, the insufficient yield of the final product, the increased number of equipments failures, the high degree of product's caking under storage, and formation of large pieces of the material), and a higher risk of fire and explosion (that is caused with formation of nitrosyl chloride due to a low pH value of the mixture). Besides, the process is characterized with a high degree of leachability of the fertilizer's nutrients in the soil as well as a high degree of dust burden due to a poor formation of granules. The high risk of fire and explosion while running the process restricts a scale of its usage for producing a fertilizer with the high content of potash-ammonium nitrate.

A process for producing a granulated nitrogen-potash fertilizer, which comprises a mixing of ammonium nitrate melt and milled potassium chloride as well as a following mechanical granulation of the mixture produced, is known from Patent FR 1476269, IPC C05D1/02, 1966. The process allows production of a granulated nitrogen-potash fertilizer with the high content of potash-ammonium nitrate. Nevertheless, conditions for mixing the hot melt with the potassium chloride require developing and maintaining some enhanced measures for excluding fire and explosion risks while running the process. Types of mechanical granulation that are used in the said process (crystallization and milling or extrusion and cutting) complicate the process and result in a sufficient number of equipment failures and a low productivity rate. The known process does not allow reaching the total conversion of raw materials in the mixture and due to this fact conversion processes could continue in the finished product which deteriorates performances of the product (strength of granules, caking property). A product produced by the process is characterized in a higher degree of leachability of nutrients from the soil.

The closest analog (prototype) of the claimed process is a method for producing nitrogen-potash fertilizer, which comprises a mixing of an ammonium nitrate melt with a solid potassium chloride and a specific mineral addition (which reduces a leachability of the fertilizer from a soil) in the presence of ammonia, a dosage of ammonia is chosen under a condition to keep a pH value of the mixture within the range of 6.5-7.5, then the mixture is granulated in a drum granulator and dried (Patent RU 2233823, IPC C05G1/00, 2004 (the prototype)).

The known method allows production of nitrogen-potash fertilizers that contain basically ammonium nitrate and potassium chloride or potassium nitrate and ammonia chloride depending on conditions (a mixing time, a temperature and the like). The main disadvantages of the method for producing ammonium-potash nitrate and other types of nitrogen-potash fertilizers with a high content of potassium nitrate are: an insufficient productivity rate that is caused by the higher number of equipment failures; the low degree of conversion at the step of mixing and granulation; an easy leachability of the fertilizer from the soil; and a low strength of granules.

DISCLOSURE OF THE INVENTION

The instantly claimed process provides a production of a complex granulated, prolonged action nitrogen-potash fertilizer of potassium-ammonium nitrate type.

The main technical result lies within increasing of the process productivity rate while producing the fertilizer due to a quick proceeding of the conversion process. At the same time physical properties of the product are improved—fertilizer leachability from the soil is reduced and strength of granules is increased.

An achievement of the technical results is ensured in that way as in the process for producing a complex granulated nitrogen-potash fertilizer, which comprises a mixing of an ammonium nitrate melt with a solid potassium chloride and a specific mineral admixture, which reduces a leachability of the fertilizer from the soil, in the presence of ammonia, a dosage of ammonia is chosen under a condition to keep pH value of the mixture within the range of 6.5-7.5, granulation of the mixture in a drum granulator and drying a product, wherein phosphogypsum is used as the specific mineral admixture and the components are fed for mixing under the following ratios, weight %: ammonium nitrate 33-69; potassium chloride 22-65; phosphogypsum 2-9; and granulation is carried out under a recycle ratio of 1:(2-2.5).

Furthermore, the mixing of the components is carried out at the temperature of 100-130° C. during 20-30 minutes.

The next chemical reactions take place under mixing:

$$NH_4NO_3+KCl=KNO_3+NH_4Cl \qquad (1)$$

$$NH_4NO_3+2KNO_3=NH_4NO_3*2KNO_3 \qquad (2)$$

$$NH_4NO_3+2KNO_3=(K,NH_4)NO_3 \qquad (3)$$

$$KCl+NH_4Cl=(NH_4,K)Cl \qquad (4)$$

So a double salt and solid solutions are produced as well as potassium nitrate and ammonium chloride. Reactions (1)-(4) occur in solutions and solid mixtures, the reaction (1) is a governing one for improving physical properties of the fertilizer (Posin E.M. Technology of mineral salts (fertilizers, pesticides, industrial salts, alloys and acids). Part 2, 4th edition. Publisher <<Chemistry>>, Leningrad division, 1974, p. 1208 (in Russian)). The claimed process provides for a completion or achievement of a high degree of conversion at the initial stage of mixing and during the following stirring of the components. The safety of the product and the yield of marketable fraction have been increased after the conversion process being completed at the mixing stage due to formation of double salts. At the same time the properties of the product have been improved, namely, a strength increases and a hygroscopic property decreases as well as a leachability of the fertilizer from the soil. A presence of ammonia at the mixing stage in the amount, which is necessary to keep up a pH value within the range of 6.5-7.5, accelerates the conversion process of ammonium nitrate and potassium chloride into final products, prevents and decreases formation of nitric acid, suppresses oxidation reactions and in this way ensures a higher productivity rate and safety of the process. Under pH to values less than 6.5 the formation of nitrosyl chloride is observed and risks of fire and explosion are increased, under pH values more than 7.5 losses of ammonia are increased and strength of granules is decreased. An injection of phosphogypsum leads to acceleration of the conversion process and improvement of granulation process that, in turn, increases a productivity rate of the process. At the same time the product becomes safer against risks of fire and explosion. A decrease of phosphogypsum's content down to values less than 2% by weight leads to a decrease of the yield of the marketable fraction, a reduction in a productivity rate and strength of granules as well as to a deterioration of agrochemical properties of the fertilizer and an increase of fertilizer's leachability from the soil. A content of phosphogypsum higher than 9 weight % does not lead to an additional increase of a conversion ratio but deteriorates agrochemical properties of the fertilizer due to a reduction in a content of such nutrients as nitrogen and potassium. Dosing and mixing of the components are realized within very strictly chosen ranges, weight %: ammonium nitrate 33-69, potassium chloride 22-65, phosphogypsum 2-9. The optimal combinations of mixture components are achieved within the mentioned limits of components' contents and the maximal productivity rate of the process for producing fertilizer is achieved under these combinations including favorable conditions for the accelerated formation of granules and the high yield of marketable fractions of the fertilizer. The granulation process is deteriorated when a content of ammonia nitrate is less than 33 weight % and, at the same time, a yield of marketable fractions is decreased, the final product is limited by a content of nutrients. The propensity of product granules to caking increases when a content of ammonium nitrate is higher than 69 weight % or a content of potassium chloride is less than 22 weight % due to the fact that the high content of ammonium nitrate is remained after mixing. If a content of phosphogypsum is less than 2 weight % at the same time, the production process becomes risky for fire and explosion. The granulation process is deteriorated when a content of potassium chloride is more than 65 weight %, a yield of marketable fractions and a productivity rate of the process are sufficiently decreased under a shortage of phosphogypsum (its content less than 2 weight %).

A slurry produced in a mixer goes for granulation to a drum granulator where it is sprayed onto a recycle product (as a non-standard part of the product). The maximal security and high productivity of the process are obtained when a recycle ratio is maintained within the range of 1:(2-2.5). At the same time a granulation process is improved, a yield of marketable fractions is increased, and a dust burden is decreased.

Mixing of the mixture components at the temperature of 100-130° C. during 20-30 minutes ensures reaching a conversion degree more than 73% for conversion of ammonium nitrate and potassium chloride into potassium nitrate and ammonium chloride for all grades of nitrogen-potash fertilizers produced in accordance with the claimed process.

As described above, the process proposed allows increase of productivity rate of the process and improve properties of the final product—to increase strength of granules and reduce fertilizer leachability from the soil.

The essence of the invention and technical results obtained are clarified with the following specific examples:

EXAMPLE 1

In accordance with the invention a 80% melt of ammonium nitrate was fed into a mixer under a rate of 17.9 t/hour (41 weight %); potassium chloride under a rate of 19.6 t/hour (56 weight %), phosphogypsum containing 3 weight % of $H_2O$ under a rate of 1.08 t/hour (3 weight %), and gaseous ammonia were fed throughout dosing feeders. A mixture was then stirred during 20 minutes at the temperature of 120-130° C., pH of the mixture was kept about 6.5 with the fed ammonia. The obtained mixture was fed into a drum granulator-dryer where it was granulated together with a non-standard part of the product (a recycle product) under a recycle ratio (a ratio between the final product and the recycle product) being equal to 1:2.0 and then dried. The granulated product was cooled. The next raw materials were used for producing the mixture: potassium chloride, technical grade by GOST 4568-95; phosphogypsum—a by-product of phosphoric acid production by TU 113-03-18-27-89, having the next composition CaO—40%, $SO_3$—57%; ammonium nitrate, which was produced by the reaction of ammonia with nitric acid. Some procedures of chemical analyses (a composition of mixture and product, a degree of conversion) and calculations (a recycle ratio, a productivity rate) were used for estimation of the process and properties of the product. Physical and chemical properties of the product were determined by GOST—2-85 (strength, flowability, granulometric composition), a yield of the product was determined by a granulometric composition—a product with granules of 1-5 mm was considered as the standard one. A degree of conversion was calculated for the component (ammonium nitrate, potassium chloride) that underwent the maximal conversion by reaction (1). A non-standard product having granules of sizes less than 1 mm and more than 5 mm was returned (after milling) as a recycle product for granulation. Process parameters, a chemical composition of the product and properties of the product are shown in the table.

EXAMPLE 2

In accordance with the invention a 90-93 weight % melt of ammonium nitrate was fed into a mixer under a rate of 20.5 t/hour (52 weight %); potassium chloride under a rate of 15.8 t/hour (44 weight %), phosphogypsum under a rate of 1.44 t/hour (4 weight %), and gaseous ammonia were fed throughout dosing feeders. A mixture was stirred during 20 minutes at the temperature of 100-110° C., pH of the mixture was kept about 6.5 with the feed of ammonia. The mixture produced was granulated together with a recycle product under a recycle ratio being equal to 1:2.1. Then the process was carried out according to Example 1. Process parameters, composition of the product and properties of the product are shown in the table.

EXAMPLE 3

In accordance with the invention a 85-86 weight % melt of ammonium nitrate was fed into a mixer under a rate of 23.1 t/hour (52 weight %); potassium chloride under a rate of 15.2 t/hour (40 weight %), phosphogypsum under a rate of 3.04 t/hour (8 weight %), and gaseous ammonia were fed throughout dosing feeders. A mixture was stirred during 20 minutes at the temperature of 115-125° C., pH of the mixture was kept about 7.0 with the feed of ammonia. The mixture produced was granulated together with a recycle product under a recycle ratio being equal to 1:2.5. Then the process was carried out according to Example 1. Process parameters, composition of the product and properties of the product are shown in the table.

EXAMPLE 4

In accordance with the invention a 80-83 weight % melt of ammonium nitrate was fed into a mixer under a rate of 15.8 t/hour (33 weight %); potassium chloride under a rate of 23.1 t/hour (59 weight %), phosphogypsum under a rate of 3.1 t/hour (8 weight %), and gaseous ammonia were fed throughout dosing feeders. A mixture was stirred during 30 minutes at the temperature of 120-130° C., pH of the mixture was kept about 7.5 with the feed of ammonia. The mixture produced was granulated together with a recycle product under a recycle ratio being equal to 1:2.0. Then the process was carried out according to Example 1. Process parameters, composition of the product and properties of the product are shown in the table.

EXAMPLE 5

In accordance with the invention a 90-93 weight % melt of ammonium nitrate was fed into a mixer under a rate of 20.2 t/hour (45 weight %); potassium chloride under a rate of 19.7 t/hour (48 weight %), phosphogypsum under a rate of 2.87 t/hour (7 weight %), and gaseous ammonia were fed throughout dosing feeders. A mixture was stirred during 30 minutes at the temperature of 100-110° C., pH of the mixture was kept about 6.5 with the feed of ammonia. The mixture produced was granulated together with a recycle product under a recycle ratio being equal to 1:2.4. Then the process was carried out according to Example 1. Process parameters, composition of the product and properties of the product are shown in the table.

EXAMPLE 6

In accordance with the invention a 58-86 weight % melt of ammonium nitrate was fed into a mixer under a rate of 24.0-35.6 t/hour (48 weight %); potassium chloride under a rate of 18.9 t/hour (44 weight %), phosphogypsum under a rate of 3.44 t/hour (8 weight %), and gaseous ammonia were fed throughout dosing feeders. A mixture was stirred during 40 minutes at the temperature of 115-125° C., pH of the mixture was kept about 6.5 with the feed of ammonia. The mixture produced was granulated together with a recycle product under a recycle ratio being equal to 1:2.2. Then the process was carried out according to Example 1. Process parameters, composition of the product and properties of the product are shown in the table.

EXAMPLE 7

In accordance with the invention a 80-83 weight % melt of ammonium nitrate was fed into a mixer under a rate of 35.6 t/hour (69 weight %); potassium chloride under a rate of 9.3 t/hour (22 weight %), phosphogypsum under a rate of 3.78 t/hour (9 weight %), and gaseous ammonia were fed throughout dosing feeders. A mixture was stirred during 20 minutes at the temperature of 120-130° C., pH of the mixture was kept about 7.0 with the feed of ammonia. The mixture produced was granulated together with a recycle product under a recycle ratio being equal to 1:2.4. Then the process was carried out according to Example 1. Process parameters, composition of the product and properties of the product are shown in the table.

EXAMPLE 8

In accordance with the invention a 90-93 weight % melt of ammonium nitrate was fed into a mixer under a rate of 16.8 t/hour (35 weight %); potassium chloride under a rate of 24.7 t/hour (56 weight %), phosphogypsum under a rate of 3.96 t/hour (9 weight %), and gaseous ammonia were fed throughout dosing feeders. A mixture was stirred during 20 minutes at the temperature of 100-110° C., pH of the mixture was kept about 7.5 with the feed of ammonia. The obtained mixture was granulated together with a recycle product under a recycle ratio being equal to 1:2.3. Then the process was carried out according to Example 1. Process parameters, composition of the product and properties of the product are shown in the table.

EXAMPLE 9

In accordance with the invention a 85-86 weight % melt of ammonium nitrate was fed into a mixer under a rate of 13.5 t/hour (33 weight %); potassium chloride under a rate of 22.75 t/hour (65 weight %), phosphogypsum under a rate of 0.7 t/hour (2 weight %), and gaseous ammonia were fed throughout dosing feeders. A mixture was stirred during 10 minutes at the temperature of 115-125° C., pH of the mixture was kept about 6.5 with the feed of ammonia. The obtained mixture was granulated together with a recycle product under a recycle ratio being equal to 1:2.5. Then the process was carried out according to Example 1. Process parameters, composition of the product and properties of the product are shown in the table.

EXAMPLE 10

In accordance with the invention a 85-86 weight % melt of ammonium nitrate was fed into a mixer under a rate of 16.8 t/hour (40 weight %); potassium chloride under a rate of 19.5 t/hour (54 weight %), phosphogypsum under a rate of 2.16 t/hour (6 weight %), and gaseous ammonia were fed throughout dosing feeders. A mixture was stirred during 10 minutes at the temperature of 115-125° C., pH of the mixture was kept about 7.0 with the feed of ammonia. The obtained mixture was granulated together with a recycle product under a recycle ratio being equal to 1:2.2. Then the process was carried out according to Example 1. Process parameters, composition of the product and properties of the product are shown in the table.

EXAMPLE 11

The process is carried out in accordance with Example 1, but there are some differences: A mixture was stirred during 30 minutes at the temperature of 130-140° C., and the mixture produced was granulated together with a recycle product under a recycle ratio being equal to 1:2.5. Process parameters, composition of the product and properties of the product are shown in the table. The Instant Example results in a lower yield of the marketable product and reduced productivity of the process. Besides, a formation of nitrosyl chloride becomes quite possible, which leads to an increase of fire and explosion risks while realizing the process.

EXAMPLE 12

The process is carried out in accordance with Example 3, but there are some differences: A mixture was stirred during 30 minutes at the temperature of 90-100° C., and the mixture produced was granulated together with a recycle product under a recycle ratio being equal to 1:2.0. Process parameters, composition of the product and properties of the product are shown in the table. The product produced by this Example has a lower yield of the marketable product and a conversion degree and a productivity of the process is reduced at the same time. Besides, a dust burden occurs leading to clogging of the equipment.

EXAMPLE 13

According to the Prototype

A 85-86 weight % melt of ammonium nitrate was fed into a mixer under a rate of 13.8 t/hour (44 weight %); potassium chloride under a rate of 13.0 t/hour (48 weight %), zeolite under a rate of 1.08 t/hour (4 weight %), magnesium phosphate under a rate of 0.54 t/hour (2 weight %), ammonium sulphate under a rate of 0.54 t/hour (2 weight %), and gaseous ammonia for correcting pH were fed throughout dosing feeders. A mixture was stirred during 30 minutes at the temperature of 120÷130° C., pH of the mixture was kept about 7.5 with the feed of ammonia. Then the process was carried out according to Example 1. Process parameters, composition of the product and properties of the product are shown in the table.

EXAMPLE 14

Control

A 85-86 weight % melt of ammonium nitrate was fed into a mixer under a rate of 13.9 t/hour (44 weight %); potassium chloride under a rate of 14.1 t/hour (52 weight %), zeolite under a rate of 1.08 t/hour (4 weight %), and gaseous ammonia for correcting pH were fed throughout dosing feeders. A mixture was stirred during 30 minutes at the temperature of 120-130° C., pH of the mixture was kept about 7.5 with the feed of ammonia. Then the process was carried out according to Example 1. Process parameters, composition of the product and properties of the product are shown in the table.

| | In accordance with the claimed process | | | | | | | | | |
|---|---|---|---|---|---|---|---|---|---|---|
| | | | | | Technological properties | | | | | |
| No | Composition of the mixture, % | | | | Conversion time, | Conversion ratio in the product, | | Operational | Chemical composition of the product, weight % | |
| i/i | NH$_4$NO$_3$ | KCl | Phosphogypsum | pH | minutes | % | Recycle ratio | load, t/hour | KNO$_3$ | NH$_4$Cl |
| 1. | 41 | 56 | 3 | 6.5 | 20 | 73 | 1:2.0 | 35 | 37.7 | 20.0 |
| 2. | 52 | 44 | 4 | 6.5 | 20 | 75 | 1:2.1 | 36 | 44.6 | 23.6 |
| 3. | 52 | 40 | 8 | 7.0 | 20 | 90 | 1:2.5 | 38 | 48.6 | 25.8 |
| 4. | 33 | 59 | 8 | 7.5 | 30 | 100 | 1:2.0 | 39 | 41.6 | 22.1 |
| 5. | 45 | 48 | 7 | 6.5 | 30 | 98 | 1:2.4 | 41 | 55.6 | 29.4 |
| 6. | 48 | 44 | 8 | 6.5 | 20 | 96 | 1:2.2 | 43 | 57.0 | 30.2 |
| 7. | 69 | 22 | 9 | 7.0 | 20 | 98 | 1:2.4 | 42 | 26.6 | 14.1 |
| 8. | 35 | 56 | 9 | 7.5 | 20 | 100 | 1:2.3 | 44 | 44.1 | 23.4 |
| 9. | 33 | 65 | 2 | 6.5 | 10 | 70 | 1:2.5 | 35 | 29.1 | 15.5 |
| 10. | 40 | 54 | 6 | 7.0 | 10 | 75 | 1:2.2 | 36 | 37.8 | 20.0 |
| 11. | 41 | 56 | 3 | 6.5 | 30 | 73 | 1:2.5 | 30 | 37.7 | 20.0 |
| 12. | 52 | 40 | 8 | 7.0 | 40 | 65 | 1:2.0 | 29 | 35.2 | 18.9 |

| | | | | Properties of the product | | | |
|---|---|---|---|---|---|---|---|
| No | Chemical composition of the product, weight % | | | Yield of the marketable | | Strength | Leachability from the soil, |
| i/i | NH$_4$NO$_3$ | KCl | CaSO$_4$ | fraction, % | Flowability, % | kg/cm$^2$ | in 5 days, % |
| 1. | 11.1 | 28.2 | 3.0 | 97 | 100 | 30 | 31 |
| 2. | 16.7 | 11.1 | 4.0 | 99 | 100 | 38 | 30 |
| 3. | 13.5 | 4.1 | 8.0 | 98 | 100 | 49 | 29 |
| 4. | 0.1 | 28.2 | 8.0 | 98 | 100 | 54 | 21 |
| 5. | 1.0 | 7.0 | 7.0 | 97 | 100 | 49 | 31 |
| 6. | 2.8 | 1.9 | 8.0 | 99 | 100 | 52 | 31 |
| 7. | 49.9 | 0.4 | 9.0 | 97 | 100 | 50 | 35 |
| 8. | 0.1 | 23.5 | 9.0 | 96 | 100 | 52 | 32 |
| 9. | 9.9 | 43.5 | 2.0 | 98 | 100 | 35 | 40 |
| 10. | 10.1 | 26.1 | 6.0 | 98 | 100 | 38 | 32 |
| 11. | 11.1 | 28.2 | 3.0 | 96 | 100 | 30 | 38 |
| 12. | 23.9 | 14.0 | 8.0 | 97 | 100 | 36 | 31 |

| | In accordance with the prototype and comparative process | | | | | | | | |
|---|---|---|---|---|---|---|---|---|---|
| | Composition of the mixture, % | | | | Technological properties | | | | Chemical composition of the product, weight % |
| No | | | | | Conversion time, | Conversion ratio in the product, | | Operational | |
| i/i | $NH_4NO_3$ | KCl | Specific addition | pH | minutes | % | Recycle ratio | load, t/hour | $KNO_3$ | $NH_4Cl$ |
| 13. | 44 | 48 | Zeolite 4; phos. Mg -2, ammon. sulph.- 2 | 7.5 | 20 | 50 | 1:2.2 | 27 | 27.7 | 14.7 |
| 14. | 44 | 52 | Zeolite - 4 | 7.5 | 20 | 20 | 1:2.2 | 27 | 11.1 | 5.9 |

| | | | | Properties of the product | | | |
|---|---|---|---|---|---|---|---|
| No | Chemical composition of the product, weight % | | | Yield of the marketable | | Strength | Leachability from the soil, |
| i/i | $NH_4NO_3$ | KCl | The rest | fraction, % | Flowability, % | $kg/cm^2$ | in 5 days, % |
| 13. | 22.0 | 27.6 | 8.0 | 96 | 100 | 26 | 50 |
| 14. | 37.7 | 41.3 | 4.0 | 96 | 100 | 28 | 48 |

We claim:

1. A process for producing a complex granulated nitrogen-potash fertilizer, said process comprises a mixing of an ammonium nitrate melt with a solid potassium chloride and a specific mineral admixture, which reduces a leachability of the fertilizer from the soil, in the presence of ammonia, a dosage of ammonia is chosen under a condition to keep a pH value of the mixture within the range of 6.5-7.5, granulation of the mixture in a drum granulator and drying of the product, characterized in that phosphogypsum is used as the specific mineral admixture and the components are fed for the mixing under the following ratios, weight %: ammonium nitrate 33-69; potassium chloride 22-65; phosphogypsum 2-9; and granulation is carried out under a recycle ratio, which is a ratio between the final product and the recycle product, being equal to 1:(2-2.5).

2. The process of claim 1, characterized in that the mixing of the components is carried out at the temperature of 100-130° C. during 20-30 minutes.

* * * * *

UNITED STATES PATENT AND TRADEMARK OFFICE
CERTIFICATE OF CORRECTION

PATENT NO. : 7,744,672 B2
APPLICATION NO. : 11/719674
DATED : June 29, 2010
INVENTOR(S) : Sergey Mikhailovich Kononov et al.

It is certified that error appears in the above-identified patent and that said Letters Patent is hereby corrected as shown below:

On the Patent face sheet:

(75) Inventors: delete "Nevinnomysak" and insert -- Nevinnomyssk --, therefor.

Signed and Sealed this

Twelfth Day of October, 2010

David J. Kappos
*Director of the United States Patent and Trademark Office*